(12) United States Patent
Saarisalo

(10) Patent No.: US 7,775,442 B2
(45) Date of Patent: Aug. 17, 2010

(54) METHOD FOR ACCESSING AFTER-OPERATION INFORMATION OF SECURE ELEMENT APPLICATIONS

(75) Inventor: Mikko Saarisalo, Kantvik (FI)

(73) Assignee: Nokia Corporation, Espoo (FI)

( * ) Notice: Subject to any disclaimer, the term of this patent is extended or adjusted under 35 U.S.C. 154(b) by 1054 days.

(21) Appl. No.: 11/456,989

(22) Filed: Jul. 12, 2006

(65) Prior Publication Data

US 2008/0011833 A1   Jan. 17, 2008

(51) Int. Cl.
*G06K 19/00* (2006.01)
*G06K 19/06* (2006.01)

(52) U.S. Cl. .................................... 235/487; 235/492
(58) Field of Classification Search .................. None
See application file for complete search history.

(56) References Cited

U.S. PATENT DOCUMENTS

| | | | |
|---|---|---|---|
| 5,578,808 A * | 11/1996 | Taylor | 235/380 |
| 5,943,624 A * | 8/1999 | Fox et al. | 455/556.1 |
| 6,375,082 B1 * | 4/2002 | Kobayashi et al. | 235/492 |
| 6,745,944 B2 * | 6/2004 | Dell | 235/492 |
| 7,103,575 B1 * | 9/2006 | Linehan | 705/64 |
| 7,341,182 B2 * | 3/2008 | Lai et al. | 235/380 |
| 2004/0118930 A1 * | 6/2004 | Berardi et al. | 235/492 |
| 2004/0162932 A1 * | 8/2004 | Mizushima et al. | 711/103 |
| 2005/0173518 A1 * | 8/2005 | Takayama | 235/380 |
| 2006/0022058 A1 * | 2/2006 | Akiyama et al. | 235/492 |
| 2006/0029296 A1 * | 2/2006 | King et al. | 382/313 |
| 2006/0208066 A1 * | 9/2006 | Finn et al. | 235/380 |
| 2007/0050191 A1 * | 3/2007 | Weider et al. | 704/275 |
| 2007/0095892 A1 * | 5/2007 | Lyons et al. | 235/379 |
| 2007/0152035 A1 * | 7/2007 | Adams et al. | 235/380 |
| 2007/0278290 A1 * | 12/2007 | Messerges et al. | 235/380 |

* cited by examiner

*Primary Examiner*—Michael G Lee
*Assistant Examiner*—Matthew Mikels
(74) *Attorney, Agent, or Firm*—Locke Lord Bissell & Liddell LLP

(57) ABSTRACT

In a mobile terminal device a Secure Element, a main controlling unit, and near-field-communication Module form a communication triangle. A method is disclosed for providing an interface communication in the mobile terminal device comprising an operation for detecting by the main control unit that a communication between a secure element and external device has ceased.

29 Claims, 4 Drawing Sheets

Fig. 4
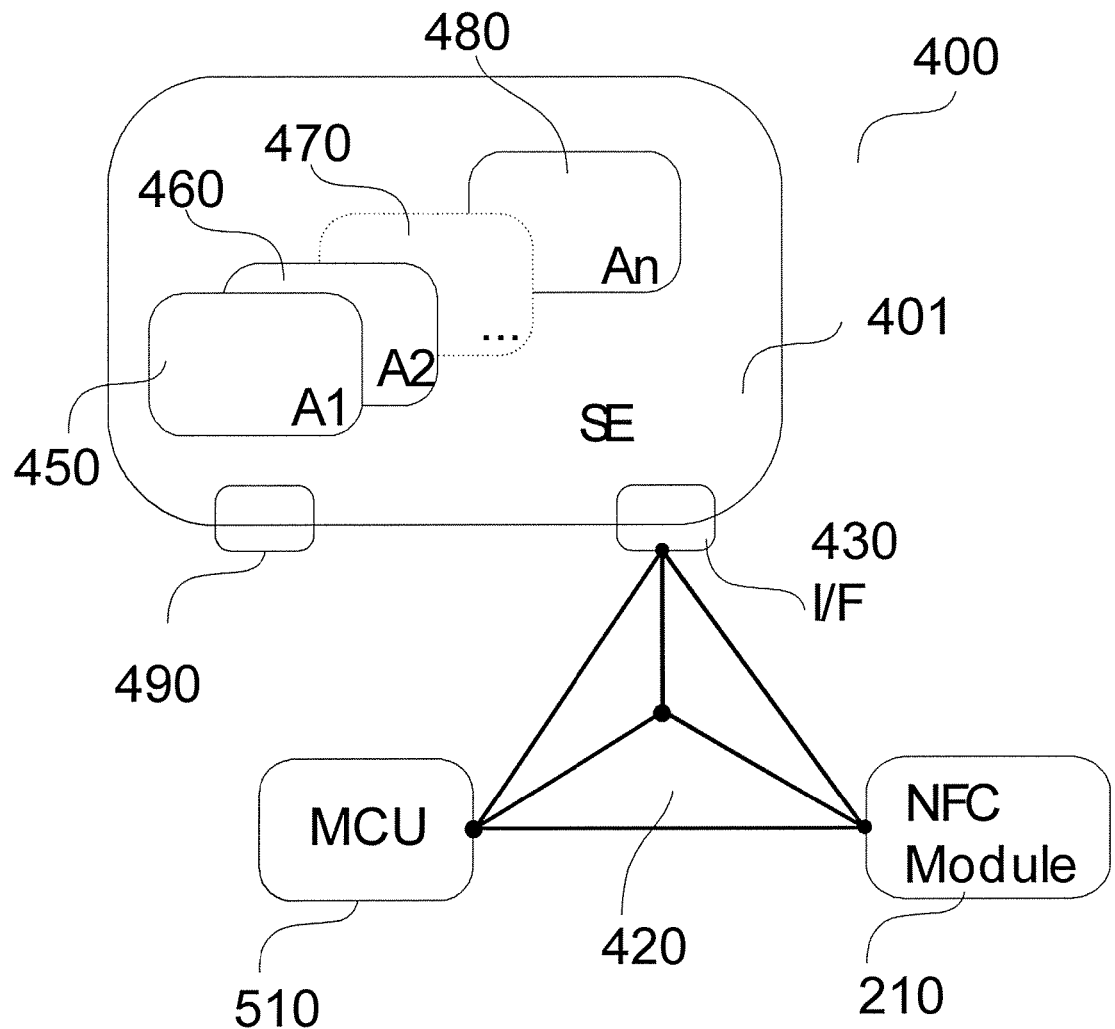
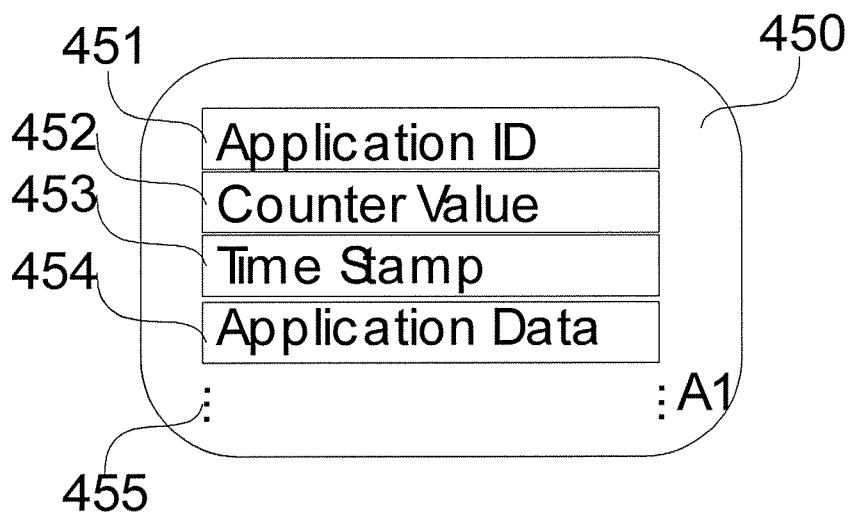

METHOD FOR ACCESSING AFTER-OPERATION INFORMATION OF SECURE ELEMENT APPLICATIONS

AREA OF THE INVENTION

The present invention generally relates to the field of a short-range communication. The short-range communication may involve an electromagnetic, magnetic, electrostatic, optical, acoustical coupling or communication technology. A possible embodiment within short-range communication is a near field communication technology (NFC), for example a wireless proximity technology, where electromagnetic and/or electrostatic coupling may be implemented in the radio frequency (RF) range of an electromagnetic spectrum, for example using a radio frequency identification (RFID) technology. In this field, a transponder suitable for radio frequency identification (RFID) may be denoted as radio frequency (RFID) tag and a radio frequency transponder reader may be denoted as a radio frequency (RFID) reader.

In particular, the present invention relates to a RFID/NFC communication, and more particularly to an arrangement suitable for enabling a terminal controller, for example a central or main processing or controlling unit (MCU) to access information which may be related to applications or data stored in a secure smartcard element (SE). Information which may be left or retained for example in a memory after a communication or transaction operation has finished is named after-operation information as known from communication using bus protocols, such as, for example small computer systems interface (SCSI).

BACKGROUND OF THE INVENTION

Transponders suitable for RFID may be used for labeling objects, to establish and to verify an identity of a person and to recognize objects provided with other transponders appropriate for RFID. Basically, a transponder may include an electronic circuit with a processor, a data storage capacity, a radio frequency (RF) interface and high frequency (HF) interface, respectively, which couples an antenna to the electronic circuit. Said transponder may be accommodated in a small container. Depending on the requirements made on the deployment concerning, for example data transmission rate, energy of the interrogation, transmission range, etc., different types of transponders suitable for RFID may be provided. A data provision and transmission capability may use frequencies ranging from direct current (DC) to daylight, including suitable frequency windows (e.g. around 134 kHz, 13,56 MHz, 860-928 MHz etc.).

Transponders suitable for RFID may be divided into active and passive transponders. Passive RFID transponders may be activated by transponder readers suitable for RFID which generate an interrogation signal, for example a RF signal at a certain frequency. Transponders suitable for active RFID may also comprise their own power supplies such as capacitors, batteries or accumulators for energizing.

Payment and ticketing applications are considered as one of the most important emerging usage areas that will leverage in RFID technology. For instance, a portable terminal such as a mobile phone implementing a RFID transponder or RFID transponder emulating means may be utilized to provide/present a digitally coded or electronic ticket, which has been obtained before, to a ticket checkpoint system of an entrance of a public transportation system. Said digitally coded ticket is read out by corresponding RFID reader, with which a checkpoint system is equipped, and is analyzed thereby. In case of a validity of said digitally coded ticket, the access to the public transportation system is granted to the owner of the portable terminal.

In combination with the above-mentioned technology, the usage of smartcards is growing steadily. Modern smartcards provide an application developer with a secure and tamper-proof environment for developing high value, secure and complex applications. Furthermore smartcards may include a central processing unit as well as secure memory areas avoiding or preventing unwanted access by third parties. Besides, cryptographic means may be provided within a smartcard, which opens the deployment of smartcards for secure applications like banking or even personal identification applications.

Smartcards may create a secure environment for storing items of monetary value while the contactless feature is fast and convenient for users who only need to bring the card in close proximity to a card reader. These types of contactless cards also do not require a Personal Identification Number (PIN). Users of the card can load a value onto the card by using an Automated Teller Machine (ATM), Voice-box or a kiosk to transfer money from a checking account, savings account, a credit card account or by inserting cash into the ATM. Many merchants are installing contactless smartcard reader/writers in their stores to provide the ability to accept smartcards as a form of payment. Also, smartcards may be used in connection with credit card and debit transactions with dynamic value, for instance.

The idea of adding a smartcard into a mobile phone or a user device in combination with a contactless reader/writer is already known in the state of the art. However, actual embodiments of smartcard phones or mobile phones having an integrated or detachable secure smartcard module respectively does not provide the user with a full control interface.

As a smartcard/secure smartcard element (SE) module may be arranged with a terminal controller (MCU) and NFC interface in connection with other elements within a mobile device there may be an interest for the MCU to access information related to applications stored in the SE substantially immediately after a transaction procedure has been completed so that the MCU can gather information regarding to applications that have been accessed by an external reader.

In a current implementation suitable for RFID based payment and ticketing there are no means for a RFID/NFC device terminal controller (MCU) to monitor, to influence or to control data communicated between an external RFID source and the secure smartcard module during the transaction procedure. Reasons for such an implementation include delay and/or security aspects that might arise when relaying the communicated RFID data through the MCU when conducting in smartcard communication.

Thus, the MCU is not capable of knowing what transactions are actually ongoing, were performed, or whether the transactions were successful or not in order to provide for example a transaction status to a user of the terminal. Also, when a mobile terminal device switches NFC communication from an external reader to a Secure Chip (SC) or a Secure Element (SE), the MCU has no means to track which applications are used on the chip. This information would be advantageous in connection with providing branding functions so that the MCU could provide an indication to the user through terminal user interface (display, loudspeakers) relating to the particular application involved with transaction procedure. Furthermore, current SE operating systems do not provide sufficient means for the user or the MCU to control the visibility of different applications. For example, the user may want to have his/her bus ticket being visible all times and the credit cards being visible only when requested so, and the MCU may be programmed to make certain applications visible based on detected environmental conditions, such as, for example detecting the presence of a bus ticketing machine or determining that current location corresponds with a local bus stop.

Therefore a motivation exists for providing the MCU with a means suitable to acquire information from the secure smartcard module regarding to applications stored in the secure smartcard substantially immediately after a transaction procedure has been completed.

SUMMARY OF THE PRESENT INVENTION

An object of the present invention is to provide a suitable means for the terminal MCU by equipping the operating system of a secure smartcard modules with a means that keeps track of what is or what was going on in the secure smartcard module. An access to after-operation data is desired.

The objects of the present invention are solved by the subject matter defined in the accompanying independent claims.

According to a typical embodiment, a method is provided which comprises passing of radio frequency communication from an external device to a secure element which is done in response of detecting that an interaction with one or more secure applications residing at the secure element is requested. Also a switching to an internal communication connection is provided for accessing information which is regarding applications involved in said radio frequency communication. Said switching takes place substantially immediately upon detecting that the radio frequency communication between the secure element and the external device has terminated. Also the performing of one or more predefined functions is provided based on the accessed information.

Advantageously, said internal communication connection excludes said secure element from an external communication.

Also, said one or more of predefined functions include/s alerts, branding functions, playing a musical tune and a displaying of a graphical element. This may imply a sequence of visual indicators and a sound cue, usually a number of beeps which may be heard including an audiovisual or aesthetic cue or signals.

Furthermore, integrating or detaching of said secure element may be provided, for example by a user or when using a little hand-held docking station, a loading device, a socket or a device suitable for plug-in.

According to an aspect of the present invention, a secure smartcard element is integrated into a typical mobile device having a main processor or controller unit (MCU), a memory, a module for near-field communication and a power supply. An interface for the MCU is provided by equipping the secure smartcard module's operating system with a control API interface providing access to information relating to accessed application identifiers (AID), counters, a list and a time stamp.

Advantageously, a mobile terminal device according to an aspect of the present invention may comprise a Secure Element. Furthermore, integrating or detaching of said secure element may be provided, for example by a user or when using a litte docking station, a socket or a device suitable for plug-in.

Also, said mobile terminal device may be provided such that said Secure Element is an integrated, a detachable or an accessory part of said mobile terminal device. Also, said Secure Element may be set-up during runtime of an application or may be part of an Operating System, for example, by defining a dedicated area of memory with defined access rights. Besides the Secure Element may be part of said smart card module, said Near Field Communication (NFC) module, and/or said memory module.

According to another aspect of the present invention an interface for the MCU is provided by equipping the secure smartcard module's operating system with a control API interface. Said interface provides access to a registry database that keeps track of last accessed application identifiers (AID), and allows the MCU evaluated the information and check whether a certain application was accessed immediately after the external RFID field has ceased and therefore allowing the terminal perform specific functions based on the evaluated information.

According to another aspect of the present invention, said interface keeps track of last accessed application identifiers (AID) in connection with an associated counting means. An AID-related value may be incremented in case of successful transaction (if step is not performed) sot that the terminal MCU can check, whether a respective application is/was accessed (AID) and whether a transaction was successfully conducted, for example by comparing a counter value with a last counter value known to the MCU.

According to another aspect of the present invention, a timestamp is set to the registry after a transaction. Thus, the MCU can check what AIDs have a success indication that is written to the registry after a last timestamp.

According to another aspect of the present invention an interface for the MCU is provided by equipping the secure smartcard module's operating system with a control API interface. Said interface provides access to a dedicated registry database that keeps track of last accessed application identifiers (AID), which may be provided with a means to register details regarding the transaction, including for example an indication of the status of the transaction, if it was successful or not, and passes a data structure or set of parameters which may include details of the actual transaction, e.g. the amount of money which was debited from user's credit card. The MCU can then evaluate the information passed over the interface and allow the terminal to perform specific functions based on the evaluated information.

According to another aspect of the present invention an interface for the MCU is provided such that an application ID is stored whenever a corresponding application is requested by an external device.

According to another aspect of the present invention an interface for the MCU is provided such that the MCU can instruct the visibility of certain applications within the secure element via the API interface, wherein the visibility of the applications is controlled by a dedicated visibility control software or a stealth level that enables the user/terminal MC to really control the operation of the secure element.

According to another aspect of the present invention an interface for the MCU is provided by equipping the secure smartcard module's operating system with a real-time control API interface. Said interface keeps track of last accessed application identifiers (AID) and passes a data structure or set of parameters that allows the MCU evaluate the information and check whether a certain application is currently accessed during the external RFID field is present and allowing the terminal perform specific functions based on the evaluated information.

In another aspect of the present invention an interface for the MCU is provided by equipping the secure smartcard module's operating system with a real-time control API interface which is suitable for special functions like active and passive sensing, a software sensor, monitoring, dual-multi ported Memory structure, buffer structure including a priority scheme and pipeline processing and a magic-T software device (directional or T-coupler).

In another aspect of the present invention an interesting way of interfacing is provided by using a so-called triangle communication three entities, the MCU and the smartcard module, the MCU and the NFC module and the NFC module and the smartcard are connected.

In another aspect of the present invention, an interface suitable for a PayPass Payment System Environment (PPSE) and PayPass (and other applications under PPSE control) is provided with improvements that PPSE supports an interface specially designed to provide information to the MCU, for example a list of applications known to PPSE within SE. Further, according to embodiments of the present invention, the interface allows the MCU to instruct the PPSE and various payment applications including the PayPass application stored in the SE to change visibility settings so that when an external reader device is trying to access any of the applications stored in the SE, both the PPSE and the application indicate that such an application does not exist in case the application is instructed to be non-visible.

It is appreciated that the SE may include means for storing instructions from MCU (for example through the API interface) regarding visibility of certain applications. Thus, when an external reader device wants to access or search for certain applications, the SE has means to indicate whether the applications are accessible or not, independently of a connection to the MCU. Advantages of the present invention will become apparent to the reader of the present invention when reading the detailed description referring to embodiments of the present invention, based on which the inventive concept is easily understandable.

Throughout the detailed description and the accompanying drawings same or similar components, units or devices will be referenced by same reference numerals for clarity purposes.

It shall be noted that the designations portable device, mobile device, mobile terminal and portable consumer electronic (CE) are used synonymously throughout the description.

BRIEF DESCRIPTION OF THE DRAWINGS

The accompanying drawings are included to provide a further understanding of the invention and are incorporated in and constitute a part of this specification. The drawings illustrate embodiments of the present invention and together with the description serve to explain the principles of the invention. In the drawings.

FIG. 4 illustrates various functional entities within the SE and a zoomed application record thereof, related to the aspects of the present invention.

DETAILED DESCRIPTION

Figure 1:
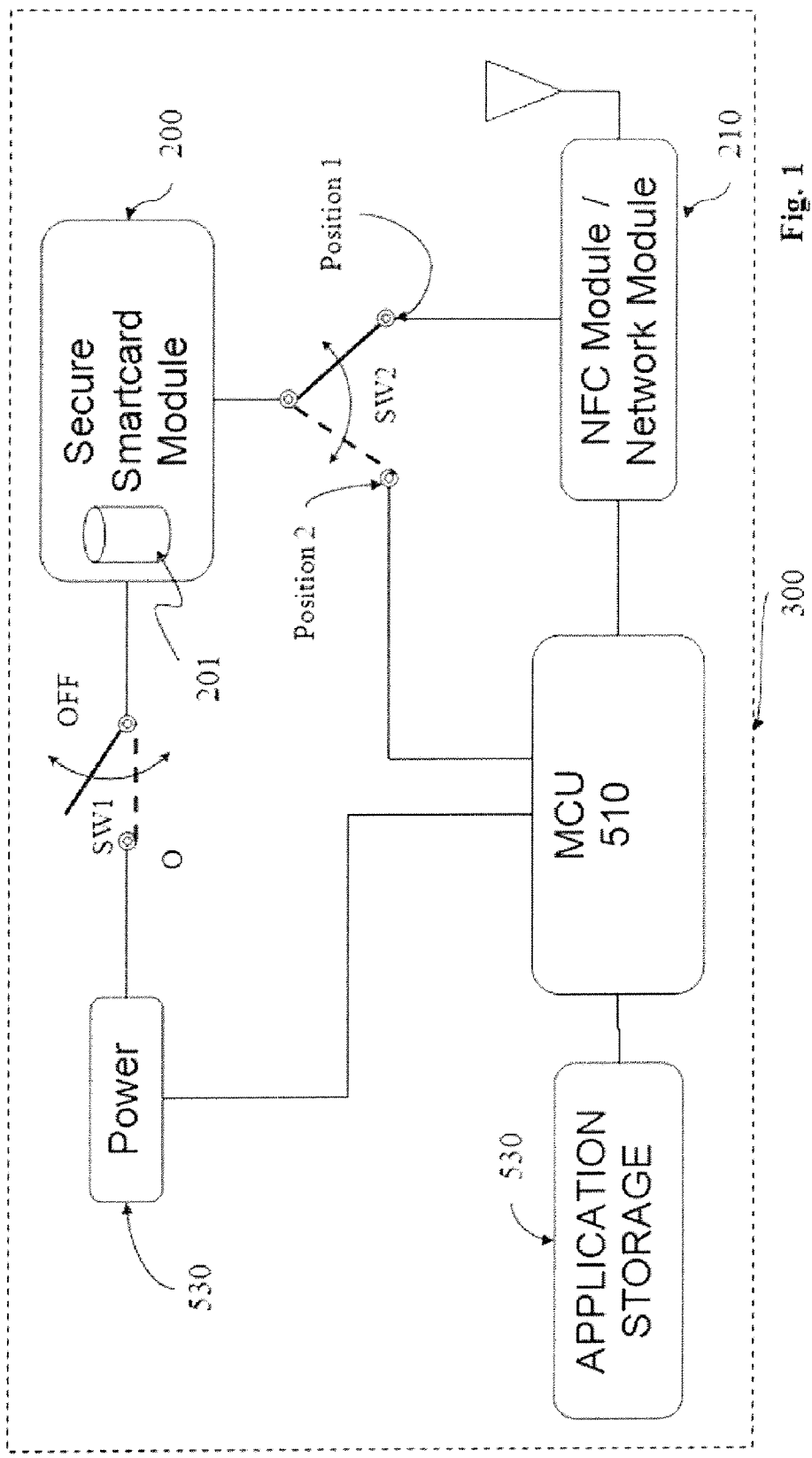
FIG. 1 illustrates schematically an example arrangement of a smartcard module and a NFC module in connection with other elements within a mobile device according to an embodiment of the present invention.

FIG. 1 illustrates schematically an example arrangement 300 of a smartcard module and a NFC module in connection with other elements within a mobile device according to an embodiment of the present invention.

According to an embodiment of the present invention a secure smartcard element 200 is integrated into a typical mobile device (not shown in FIG. 1). Said smartcard module 200 may also comprise a secure storage area module 201. Said secure storage module 201 may be used for storing different data in a tamperproof environment on the smartcard. Said data may comprise secure applications, private data, important receipts or the like. As illustrated, the secure smartcard element 200 is connected to a power source via a user controllable switch SW1, which provides necessary power to the secure smartcard element for powering it up or shutting it down.

The secure smartcard element 200 is further connected via a switch SW2 either to a Near Field Communication (NFC) interface 210 providing connectivity with external devices by means of using e.g. RFID or optical connection, or alternatively to terminal MCU (510) for providing control to the secure smartcard element 200. It should be noted that the term mobile control unit (MCU) and central processing unit (CPU) are used synonymously throughout the description.

The NFC interface 210 provides necessary means to communicate with external tags/devices using e.g. RFID technology so that the terminal can conduct RFID-based payment and ticketing transactions, but not limited thereto. The NFC interface 210 allows both reading and writing operations to be conducted both to and from external tags/devices and also peer-to-peer type communication between two NFC terminals. In addition, the NFC interface 210 is capable of providing tag emulation so that an external reader device can consider the NFC interface 210 as a normal RIFD tag. The secure smartcard element 200 is directly linked to the NFC interface 210, by means of said switch SW2, in order to ensure that there will be no unnecessary delays within terminal logic that might hinder/prevent transactions due to the nature or RFID communication, which will typically require fast response times. A RFID transaction, for instance, will be typically conducted within hundreds of milliseconds.

The terminal MCU 510 is responsible for directing overall terminal operations and executing various applications. In connection with the MCU there is application/application interface storage 530, which is responsible for maintaining available applications/application interfaces for the MCU 510 to execute.

The following describes the operation of the above-mentioned switches SW1 and SW2. The power switch SW1 enables the user of the mobile terminal (or MCU based on certain conditions) to control the operation of the secure smartcard element 200, so that the secured applications in the secure smartcard element 200 cannot be contacted without user or MCU control. Thus, when a user wants to interact/activate secure applications stored at the secure smartcard element 200, the switch may be activated by selecting e.g. secure applications from terminal user interface (UI), which closes the switch SW1 to activate the secure smartcard element. In addition, according to an embodiment of the present invention the MCU might also be capable of controlling the power switch SW1 based on various conditions, including, but not limited to sensed environmental condition including e.g. location and currently active applications that might benefit.

The power switch SW1 may be preferably associated with a timer, which opens the switch SW1 (shuts the secure smartcard element down) after certain predefined (user-selectable) time period (time can be e.g. 15, 30, 45, or 60 sec), which ensures that the secure smartcard element 200 will not be active unintentionally or accidentally. The user may be provided with a UI interface for selecting suitable timer condition to be used as a default control for shutting down the secure smartcard element 200. Further, the MCU 510 might be able to provide indications that the secure smartcard element is active and postpone the starting point of the timer, for instance.

The activation of the secure smartcard element may be done without certain authorization steps. An Authorization is typically done by requesting certain PIN code from the terminal user in order to activate the secure smartcard element 200. When user selects e.g. "mobile payment applications" from the terminal User Interface (UI), the authorization PIN may be requested and if correct PIN is entered, the secure smartcard element 200 is activated and mobile payment applications are active. The user may also be provided with a chance to change the PIN code. If the user fails to provide the necessary PIN code subsequently for e.g. three times, the secure smartcard element will be permanently closed unless a higher level authorization code (compare to SIM and PUK codes in GSM) is entered to re-activate the secure smartcard element 200. This code could be provided to all users in a separate medium and if necessary, users may request that code from a service provider (e.g. transaction authorization entity) in response of providing valid authentication.

The internal/external switch SW2 enables the user of the terminal (selected application) to control the current operation/interface of the secure smartcard element 200. If e.g. a mobile payment application is initiated, the switch SW2 is set to activate connection with the NFC interface 210 to enable communication with external sources, corresponding to a Position 1 of switch SW2, such as, for example conducting payment/ticketing transactions with using the secure applications at the secure smartcard element 200.

The user of the mobile terminal may also be provided with an interface to select only certain applications of the applications to be active, so that the secure smartcard element is powered but only certain secure transaction applications may be active. Said operation may also be controlled by the MCU, based on the active applications and context or present environment of the terminal to ensure that only preferred applications will be available. Selection of the applications is based on software control so that the set of available applications at a time is controllable either by a user of the mobile terminal for example by way of selecting certain applications to be open, or by the MCU based on a current context of the terminal. With this kind of functionality, an external source (e.g. a Point-of-sale terminal) cannot "scan" all the applications residing in the secure smartcard element 200, which enhances the security and anonymity aspects of the present invention and provides the user of the terminal more control over transactions conducted via the secure smart card element 200.

If the internal/external switch SW2 is set to internal communication, corresponding to Position 2, the switch SW2 allows a user of said mobile terminal to interact with the secure applications at the secure smartcard element. This interaction might include reading log information from the applications and interacting with the applications. According to an embodiment of the present invention, the secure smartcard element is capable of maintaining a log keeping record of each transactions (e.g. date; amount; location) relating to the payment/ticketing transactions. When the switch SW2 is set to internal communication, the user is capable of viewing the information relating to the conducted transactions and control the applications at the secure smartcard element 200, by means of a graphical user interface, for instance.

Basically in the present invention the following, typical flow of events may take place: On the software side of the mobile terminal device—an entity named the phone for simplicity, for example represented by the MCU and an associated application—an external reader is detected by the phone. The phone finds out whether the external reader wants to communicate with an application stored at the secure element (SE). The phone may at this operation read a counter value from the secure element, if it does not have it stored on the phone software side. The phone switches the communication to the SE, for example by switching SW2 from position 2 to position 1. When the phone detects that the communication with the SE must be over, it substantially immediately switches the connection of the SE from the NFC antenna to the phone Software, for example by switching SW2 from position 1 back to position 2 (FIG. 1). The phone can now access the SE. The phone may request information including e.g. the last application identifier (AID) and a counter value from the SE. If the counter has been incremented from a previous value, the phone can determine that an application has been accessed. Based on the AID, the phone can look for related branding application (or any other phone side application, equally) to be executed. The branding application may include displaying a branding logo or a picture and/or playing a branding rhyme so that a user of the phone can associate the conducted transaction with the outputted branding indication.

A variation of this procedure is that the SE may maintain a list of last accessed AIDs and their counter values. This list may be implemented for instance as a ring buffer or a last-out-first-in memory managing scheme. Another variation is that the phone sets a timestamp value to the SE every time the phone powers the SE, for example by actuating Switch SW1 (FIG. 1) in the "ON" position. In this case, the SE can associate the AID with a timestamp instead of a counter value.

As it may be noted the operations seem to be explained very simple on the first glance, as an easy, convenient and straightforward understanding for the skilled person was intended and provided. Nevertheless should that be misunderstood or construed in a limiting sense as this is rather just the beginning in the view of the embodiments according to the present invention as follows.

Figure 3:
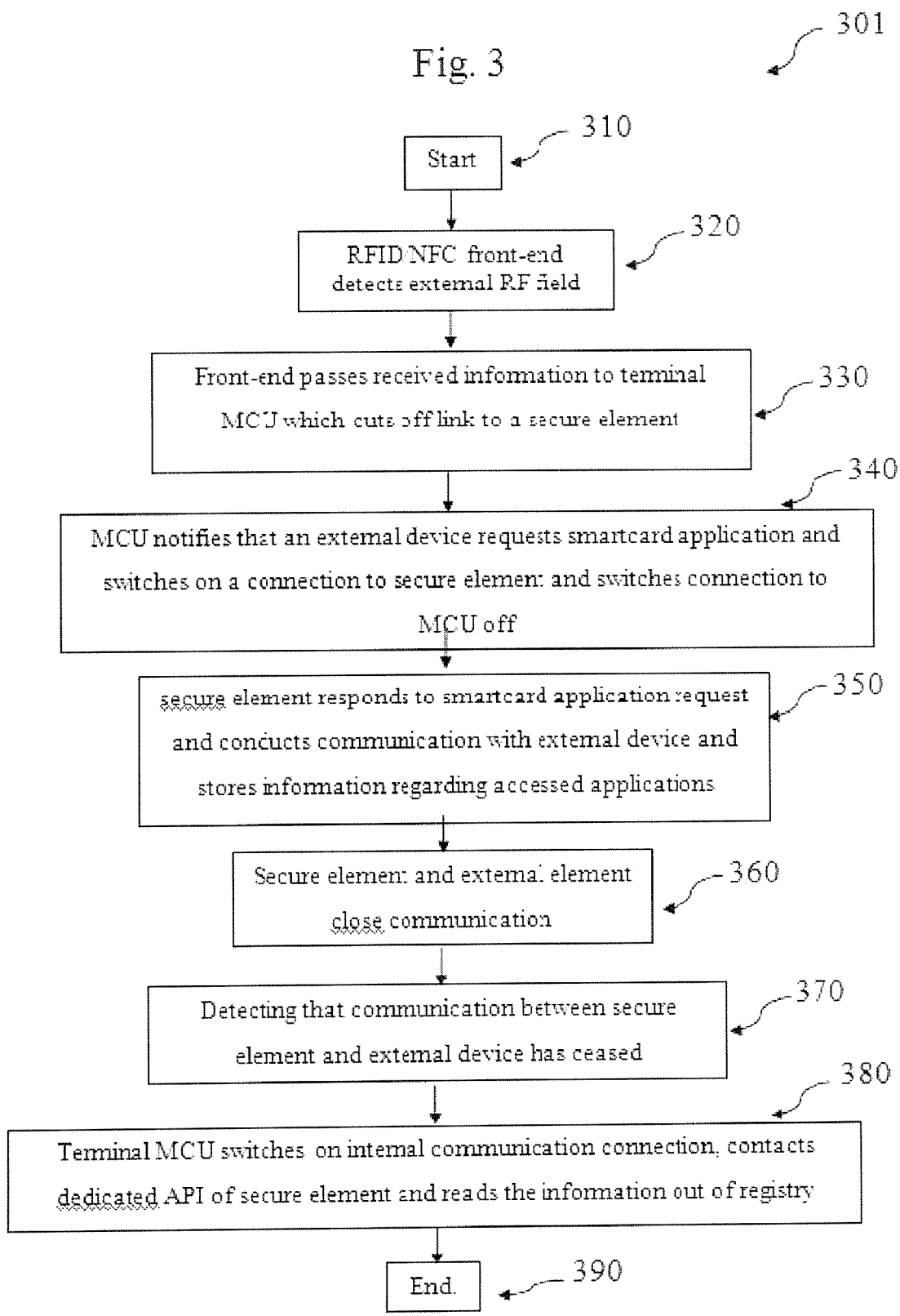
FIG. 3 is a flowchart illustrating an interface example in connection with a transaction procedure according to an embodiment of the present invention.

In an embodiment of the present invention, FIG. 3 shows a flow chart illustrating interface operations between terminal MCU and secure smartcard in connection with a RFID transaction procedure. Said operations may partly overlap in practice or may be in operation or out of operation in the sense of a variable time-shift or offset. Also, said operations form an example suitable to describe an interface for a communication procedure 301. In a communication, the MCU, the operating system of secure smartcard, a module suitable for a far-field, near-field or network communication like RFID/NFC and an external device are involved.

Said interface or interface procedure is started or called in operation 310. In an early operation 320, a RFID/NFC front-end may detect an external radio frequency (RF) field, a radiation field, or directed radiation or any directivity, for example, by using information from a service which delivers data from a radio signal strength indicator (RSSI), a radio location service or even doing its own measurements on voltage standing wave ratio (VSWR) or other parameter describing an RF connection. In operation 330, the front-end (NFC interface 210) may pass received information to a terminal MCU; for example, a link to a secure element is cut off or established and optionally, no power may be provided to said secure element. It may be the case, that the link between SE and NFC interface is already cut off in this "normal" operation mode, so the above expression should not be construed narrowly.

In a subsequent operation 340 said terminal MCU may notify, based on the information received through the front-end that an external device is requesting to discover a contactless smartcard application and may switch on a connection to said secure element that results to switching off a connection between SE and MCU as can be seen from FIG. 1. In Operation 350, said secure element may respond to requests for certain smartcard application which may be based on the capabilities of the secure element (stored or stand-alone applications) and may conduct a communication with said external device. Still in operation 350, said secure element may store information regarding to the accessed applications, such as, for example an application identifier (AID). For providing an AID, a dedicated registry may be set-up, updated and maintained by a dedicated software program. Said registry may have typical features as to a management of rights, access and information.

In operation 360, said secure element and said external element may complete or close communication therebetween. In a late operation 370, upon it may be detected that said communication between the secure element and said external device has ceased, the terminal MCU may switch in operation 380 to a communication connection, which is device internal and may contact a dedicated application program interface (API) of said secure element and access the information which may be stored in the registry or suitable information service. Although the process may end in operation 390, this may be rather an exit point to another routine, for further processing. Before the exit a preparation of a memory area or a storing of a memory structure and/or a data transfer of the information which were read out from the API before may be provided for easy processing of said interface or interface procedure.

FIG. 4 illustrates various functional entities related to the aspects of the present invention within the SE. Also, a zoomed application record is provided in the lower portion of this FIG. 4.

An arrangement 400 is formed of a Secure Element (SE) 401, a main control unit (MCU) 510 and Near-field communication (NFC) Module 210. A triangle-shaped, so-called Delta connection 420 is interconnecting the first Interface I/F 430 of the SE 401, the MCU 510 and the NFC Module 210. Note that the NFC-Module may be also a network Module (not shown).

In the SE 410, there are application records of applications A1, A2, ... to An denoted by 450, 460, 470 and 480, respectively. Said application records may be part or a copy of a dedicated registry. Each record A1 to An is representing an $1^{st}$ to $n^{th}$ application, respectively. Also, a second interface 490 for a registry or a memory is provided. Note that said SE 401 may also be part of a memory area. Insofar, SE 401 may be or represent an inner memory and the memory outside the boundaries may be an outer memory. Said second interface 490 may serve for communication between said application records A1 to An and said registry or memory.

Said interfaces 430 or 490 may be buffered or represent a shared memory area, for example said buffering may be provided bidirectionally and the sides being connected to the interface may run on different speeds as to data transfer, updating and/or buffer scanning. Thus, an interface for the MCU and registry is included for storing AIDs, counter values/time stamps for various applications stored in the SE. The latter may indicate whether certain application was accessed by an external reader.

In the lower portion of FIG. 4, a Record or sample Datastructure of application A1 denoted by 450 is illustrated in zoomed-in manner. For example, Application ID 451 corresponding to an application, a counter value 452 which may be related to Application ID 451, and a Time stamp may be provided. Furthermore, Application Data 454 specific to the application suitable for interprocess communication, including settings, or other default values, parts of a visibility matrix etc. may be provided. Expansion, further or reserved Data (not shown), is denoted with 455.

It may be appreciated this records or registry, even the whole parts of the arrangement of FIG. 4, especially the interfaces, may be also realized, for example by a dedicated software plug-in which may be set-up, adapted, updated and re-configured during runtime of an application. Included may be a resizing of memory fields enabling dynamic interfaces with optimized memory usage providing a software plug-in or macro cell plug-in. Such a dynamic software plug-in may be suitable for checking from the applications whether a transaction was actually successful and storing corresponding information on a dedicated log, or a buffer structure.

In an embodiment of the present invention, said interface keeps track of last accessed application identifiers (AID) in connection with an associated counting means. In an operation where said secure element may store information regarding to the accessed applications the interface may be used for analysing AIDs, and optionally to add or modify a corresponding or related value in said counting means. For example a counter value may be incremented in case of successful transaction or decremented if no operation was successfully performed. Also, said counter could be formed by using two hexadecimal digits, which also may carry additional information, predefined hexadecimal codes which indicate a return value. For providing an AID with said counter, a specific registry may be provided by a specific software program. It may have typical features to support a suitable management of information.

In a later operation, the terminal MCU may check, whether a respective application was accessed by analysing said AID and regarding said counter and whether a transaction was successfully conducted, for example by comparing a counter value with a last counter value.

In an embodiment of the present invention, in an operation where said secure element may store information regarding to the accessed applications, the interface may be used for analysing an AID, and optionally to add or modify a timestamp to the registry after a transaction. A time stamp can be in the simplest case long number which is coding a system time, but also it can be a normal date for example mm.dd.yyyy hh:nn:ss:ff, where m stands for month, d for day an y for year, h for hour, n for minutes, s for seconds and f stands for frames.

In a later operation, the terminal MCU may check through the interface what AIDs have a success indication that is written to the registry after a last timestamp. Also, the MCU can make a comparison between successive dates, doing calendar or scheduling operations.

In an embodiment of the present invention, said interface keeps track of last accessed application identifiers (AID), may be provided with a means to register details regarding the transaction. For example details may comprise an indication of the status of a transaction. For example, a value or a level suitable for a bar graph information may be provided if said transaction was successful or not, confirm that the transaction was successful or came up to a certain operation. Therefore, a datastructure or set of parameters can be provided, for example added to a registry. In said datastructure a set of details, a data record of the actual transaction, e.g. a serial number, the amount of money, the kind of good, the location, date and time, and a financial institution which performed the transaction or which debited user's credit card can be provided.

Also, a tune, a musical melody, a sound and/or a company logo, a graphical element, a little animation, digital visual effects (DVE), an icon, etc. suitable for branding or directed advertisement, usually a link, a file name, data of a file having mp3, wav, jpg, tif, mid, etc. format which are characteristic of the payment instrument may be provided. Note that the each item of said data record may comprise its own sub data structure. For example, said serial number may be formed of an application ID, an application revision, access time etc.

In a later operation, the terminal MCU may evaluate the information passed over the interface and allow the terminal to perform specific functions like displaying a summary of the transaction.

Advantageously, the above-mentioned functions and/or operations can be performed by the mobile terminal in order to provide branding information to a user of the mobile terminal. But in addition, the same information can be provided to the user to provide some sort of additional feel of control over the various smartcard applications residing in the secure element. For example, the terminal might be configured to always provide some sort of alert when a credit card application is accessed and/or a successful transaction was conducted. In addition, the application program interface (API) can be linked to an additional software component that can provide e.g. a sort of alerts when a certain threshold value of transport tickets is used. In addition, the information provided by the secure element can be linked to calendar application so that a calendar alert can be created for example to return the book that was lend from the library.

Further benefits of the present invention in contrast to other possible means for gathering information relating to conducted transactions is as follows:

Information is reliable and provided to the user almost immediately after the transaction (if the terminal MCU tries to "eavesdrop" the information between the secure element and the external device, the information is not necessarily true. Further, if we consider a typical RFID/NFC transaction, the speed of the transaction and coverage makes the process impossible for a user to check the display during an actual transaction procedure.

Also it is ensured that needed response-times for smartcard communication are provided as the communication is not relay to the secure element through terminal MCU.

According to an embodiment of the present invention an interface for the MCU may be provided such that an application ID is stored whenever a corresponding application is requested by an external device. Optionally, in response of a successive transaction (whether it be an actual credit transfer of a VISA ™ card application or a use of a transport/cinema ticket, etc.) the registry stores an indication of completion of the transaction and possibly even the debit amount in case of a monetary exchange or other related information (the name of the book with due date for returning in case of lending a book from a library or the like, etc.).

According to an embodiment of the present invention said interface may be provided such that the MCU can instruct the visibility of certain applications. Within the secure element via the API interface information may be provided which comprises a data structure, or an arrangement suitable for a visibility profile, for example a so-called visibility matrix which may be mapped to interest groups having assigned levels of rights or insight in view of privacy, security and personalisation.

A visibility matrix according to the present invention may first denote resources or applications being available or regarding the secure element or even resources concerning the environment. The visibility matrix may also contain data over specific settings, adjustment possibilities of an application. Basically, the visibility matrix reflects the hard- and software-profile in form of a (multi-dimensional) imaging, mapping or transformation in case of coded or crypted parts. Certain visibility information thereof may describe a suitable memory organisation concerning the application.

In view of the foregoing embodiments having AID-related information, a counter, a timestamp or a detailed information of the transaction, said visibility matrix may include said options in a suitable manner or be in relation to AID-related information or a registry. For example the visibility matrix may be accommodated in the registry.

Thus, the visibility of the applications may be controlled by a dedicated visibility control software. Said software may provide a control the operation of the secure element by the MCU of a user or terminal.

According to an embodiment of the present invention, an interface for the MCU is provided by equipping the secure smartcard module's operating system with a real-time control API interface. Said interface is advanced insofar, as it may permanently keep track of last accessed application identifiers (AID) and may pass a data structure or set of selected parameters. The interface may be updated in cyclic manner and/or, scanned or activated using a timing which may be independent, incremental, selective, rhythmic, cyclic, planed or statistical.

According to yet an embodiment of the present invention an interface for the MCU is provided by equipping the secure smartcard module's operating system with a real-time control API interface which is suitable for special functions.

First, a sensing is defined. Sensing may be any kind of detecting, reading and analysing an interface or even preparatory processes of setting up an interface. In case the interface is dynamical set up or time-variantly altering its shape, sensing can extend to the different operating operations of the interface. Sensing can be done for example by viewing or monitoring the operations when said interface is activated, when data is altered. Also sensing can extend on monitoring or measuring a power consumption characteristic typical for a transaction or a procedure. Furthermore sensing can comprise a viewing of status or potentials of certain Bit-lines which may indicate certain commands or instruction to be performed. Also clocks, strobes, enable signals can be sensed. Here a sensing of an interface is interesting, for instance if a Secure Element, i.e. the applications behaves like a non-cooperative target or a nested black box.

Aforesaid a sensing can be active or passive. An active sensing means that a sensor influences the interface, assert or shut down power, may be participating at certain processes or transactions of the interface, responsive to commands or examine traces of transactions. A passive sensing is rather a listening or eavesdropping. Therefore a special function of the interface may be to support active and/or passive sensing. However, it should be noted that such sensing operations do not provide full-proof indication whether certain transaction have been conducted as there are no means to ensure that communicated data has reached and has been understood by the communication counterparts. Therefore it should be noted that a real-time control API cannot provide guaranteed information to the MCU, which makes such an approach less interesting implementation choice.

Another special function of said interface may be to support a software sensor. The MCU could monitor the traffic between the smartcard and the NFC-Module employing said active sensing, for example pay attention on external RF-fields and doing some measuring. Furthermore, sensors may dynamically be installed by setting up a hook, a probe, a data structure with pointers, interrupt vectors or single memory locations, areas may be watched, traced or managed.

Typically such a sensor or a plurality of strategic sensors may be scanned or a pattern of sensors may indicate a certain operation state, an ongoing communication, which applications are currently running etc. Furthermore, said interface may support a monitoring which may be related to capturing, recording, and filtering the communication between the external device and the Secure element etc.

Figure 2:
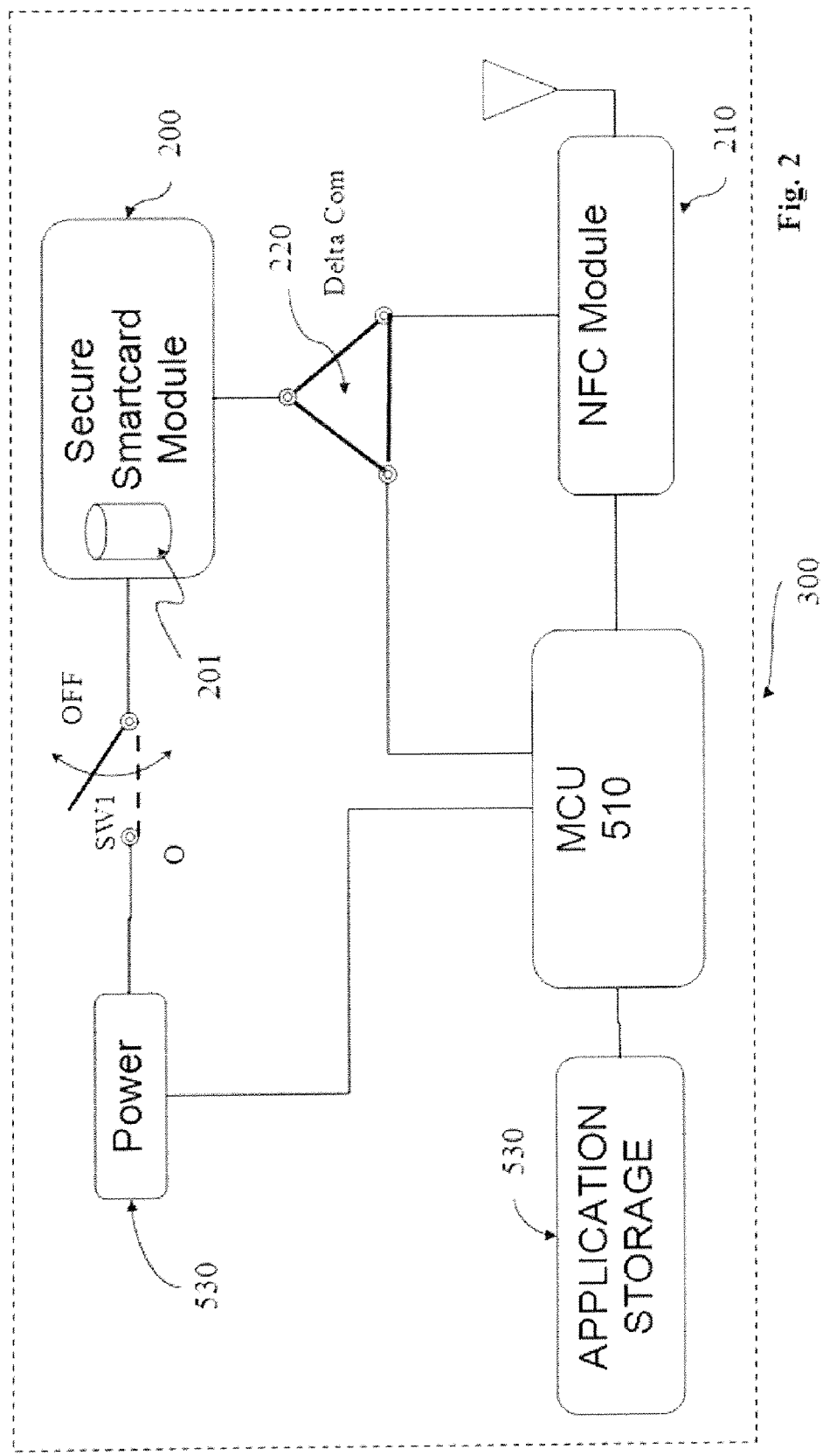
FIG. 2 illustrates the example arrangement of FIG. 1 employing delta communication according to an embodiment of the present invention.

In yet another embodiment of the present invention a potential way of interfacing is provide using a so-called triangle communication. In this case, as shown in FIG. 2 the switch SW 2 of FIG. 1 is substituted by a duplex comunication between three connected entities, the MCU and the smartcard module, the MCU and the NFC module and the NFC module and the smartcard.

Such a triangle communication may be realised using an advanced bus structure, which may be single or multi-buffered, for example using a dual- or multi-ported memory, a memory structure or a data structure. Said buffers which may also use a triangle structure, may include a management by a priority scheme, pipeline processing and updating strategies. Also a ring buffer or daisy buffer, which may be sampled can be provided where the data or a data packet is rotating or cycling through and may be available for the involved modules for a certain time.

By a triangle communication, the MCU is capable of listening, and if necessary intervening and is always up to date to the on going traffic between the smartcard and the NFC module.

According to the visibility matrix and/or in connection with software-sensors the MCU may filter out certain information which are of interest for further actions. Similar to said triangle communication or Delta communication 220 or a so-called magic-T device, which is a star or Y-structure (not shown), or a T-coupler means is provided as an example to realize the interface according to the present invention.

Such a Y-, T- or delta device may be a triangular or star-shaped connection of the MCU, the smartcard module and the NFC module suitable for sensing traffic on a line or a bus. Also the T-device may by realised by software, for example by having a data or memory structure and/or with interacting, shadowed or mirrored areas.

Thereby, the MCU is capable of sensing a communication for example by employing the visibility matrix.

With a similarly kind of access behavior like said interface, for example cyclic or concurrently, the MCU may evaluate the information and check whether a certain application is currently accessed during the external RFID field is present and allowing the terminal perform specific functions, like branding.

Note that instead of a buffered triangle communications, in the simplest case, aforesaid participants MCU, NFC module and SE may be also simply coupled with one bus, typically with bi-directional line-drivers and latches. But depending on kind of bus, clocking and traffic, on the software side the exception handling of bus collisions may be not that simple. Insofar time critical and tight protocols this solution may not allow a simple bus connection.

The inventive Delta communication 220 is advantageous as it provides a way for non-disturbed but monitorable communication. For example, two partners perform an active communication, a third partner is listening at a first time. In the next time two other partners perform an active communication, another third partner is listening.

Thus, the communication devices/partners may be changed by rotating in the triangle. Direction and speed may be timed or be determined by the running application. On the other hand, the data in the triangle buffers may rotate in the same or another direction with same or another speed. Also, the directions and speeds of communication partners and data movement in the triangle buffer, sampling etc. may dependently or independently oscillate, sweep, be in operation or out of operation. Thus, a two-dimensional communication processing is provided. In a three-dimensional case (not shown), four units/partners may communicate forming a tetraeder, as buffer structure may also form a tetraeder. Thus, Merkaba communication of variantly rotating tetraeders may be provided suitable for a mobile terminal device).

Thus, for example of the present invention, the MCU may participate in an active, cooperative, neutral or passive manner, thus accompanying the process of communication between SE an NFC module rather than relaying and delaying the process.

In yet another embodiment of the present invention an interface suitable for a Payment Procedure Secure Element (PPSE) and PayPass (and other applications under PPSE control) is provided with the enhancements that PPSE supports an interface specially designed to provide an information to the phone, for example a list of applications known to PPSE.

Furthermore, PPSE provides means for the mobile terminal software to set an application available or non available. Paypass and other controlled applications may be enhanced by providing means for said mobile terminal software to hide or to unhide an application. When said application is hidden, the applications may not respond as it normally would when selected, but rather report with an error code indicating or asserting that said application is not present.

In addition to what was mentioned above, the PPSE may be enhanced to support the software of the terminal device to modify the precedence order of different payment applications. This may enable a development, where the user may use his mobile terminal device to define the precedence order payment applications suitable for a secure card.

In this embodiment of the present invention, said interface may be implemented without specific support from the card operating system. The implementation may only affect the PPSE and the payment applications controlled. The specific PPSE may be implemented once and that can then be used with various payment applications. For payment applications themselves, the implementation includes defining an interface that may be advantageous for all the payment applications and payment instruments. Generally, applications implementing this interface and behaviour can also be used in similar manner for the application hiding in any case. If the application was installed on the SE without PPSE knowing it or not even being present, the application could anyway be hidden using this interface.

The advantage of the embodiment may be a configuration where a credit card may be hidden, but a ticket may be always available.

It may be appreciated that a SE and its Operating System includes a PPSE for controlling various payment & ticketing applications, wherein the PPSE and the various payment & ticketing applications including e.g. the PayPass application can be provided with a dedicated plug-in that is capable of hiding and making the various applications visible in response of receiving an instruction from the MCU. For example, the MCU may have an interface for instructing both the PPSE and e.g. the PayPass application to indicate that the PayPass application may have dived into an "non-visible mode"=not available, for example a camouflaged or stealth application. Thus, a requesting external device receives a "not available"-indication irrespective whether it queries directly the preferred application or tries to access the application through the PPSE, which may serve as some kind of a "central library" for the stored applications.

Also a specific implementations of PPSE and PayPass and other "controlled applications" is possible. Furthermore, the described functionality for the application and the interface is relatively simple and easy to implement in payment applications.

The advantage common to all above embodiments is that the terminal is capable of performing a branding for example by displaying the logo of a credit card company and/or playing a corresponding tune in case a corresponding payment application was involved in the transaction process. Also, specific applications can be notified and/or tasks can be performed. Furthermore, with information from the inventive interface according to the present invention, the user of the terminal has better understanding on what transaction type has happened and gains a feeling of a control in the transaction event. Besides, the credit card companies may be interested to be identified during transactions in order to increase trust and the partnership to the customers. Also, the user feels safe and is assured what was actually going on.

In addition, with this kind of solution an additional control of the device can be provided as the terminal may be triggered to play e.g. the VISA™ card tune when the VISA™ card has been accessed so that user would be noticed when certain point-of-service terminal tries to access user's credit cards.

All publications and existing systems of the Applicant mentioned in this specification are herein incorporated by reference. Although certain methods and products constructed in accordance with the teachings of the invention have been de-scribed herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A method, comprising:
   determining that an external radio frequency field from an external device has been detected by a front-end;
   switching connection of a secure element from an internal communication connection with a control unit to an external communication connection with the front-end, to pass radio frequency communication from the external device to the secure element in response to detecting that an interaction with one or more secure applications residing at the secure element is requested;
   determining that the radio frequency communication between the secure element and the external device has ceased;
   switching the connection of the secure element from the external communication connection with the front-end to the internal communication connection with the control unit in response to the determination that the radio frequency communication between the secure element and the external device has ceased, for accessing information regarding applications involved in said radio frequency communication; and
   processing information of applications involved in said radio frequency communication.

2. The method according to claim 1, further comprising:
   performing one or more predefined functions based on the accessed information.

3. The method according to claim 1, wherein said internal communication connection comprises an internal connection, and wherein said internal communication connection excludes said secure element from an external communication.

4. The method according to claim 2, wherein said one or more of predefined functions include/s alerts, branding functions, playing a musical tune and a displaying of a graphical element.

5. The method according to claim 1, further comprising of:
   accessing an identifier of last accessed applications in said secure element providing said information.

6. The method according to claim 1, further comprising:
   sensing power consumption of the secure element and/or potentials on several address lines for recognizing communication as traffic.

7. The method according to claim 1, further comprising:
   detecting an external radio frequency field by a front-end suitable for radio frequency identification and near-field communication;
   passing information received by the front-end to the control unit;
   switching off the internal communication connection of the secure element to the control unit and switching on the external communication connection of said secure element to the front-end;
   responding by said secure element to a smartcard application, conducting a communication with said external device and storing information regarding accessed applications using information of a registry;
   closing said communication between said secure element and said external device;
   detecting that said communication between the secure element and the external device has ceased;
   switching the secure element from the external communication connection to the internal communication connection; and
   contacting a dedicated application program interface of said secure element and reading information out of said registry.

8. The method according to claim 7, wherein said using information of said registry comprises the information of last accessed application identifiers.

9. The method according to claim 8, wherein said last accessed application identifiers are associated with a counter that is incremented or decremented depending on a state of a transaction.

10. The method according to claim 7, wherein said secure element and/or an application therein analyse/s a last accessed application identifier, adds and/or modifies a timestamp to the registry after a transaction.

11. The method according to claim 7, wherein said secure element and/or an application store/s details regarding a transaction which may be accessed by the control unit, wherein said details comprise an indication and/or an exit code of the status of a transaction.

12. The method according to claim 7, wherein said secure element and/or an application store/s a data structure regarding said details of a transaction suitable for accessing by the control unit later or concurrently, said data structure comprising:
   a data record of details of the actual transaction; a serial number;

an amount of money; a kind of good, a location of purchase;

a date, a time, a financial institution which performed the transaction or which debited a user's credit card and a musical tune and/or company logo characteristic of a payment instrument.

13. The method according to claim 7, wherein the control unit evaluates the information passed over the interface and instructs specific functions like displaying a summary of the transaction or branding using a sound and/or a graphical element.

14. The method according to claim 7, wherein the control unit instructs or recommends a visibility of certain applications suitable for a transaction between said secure element and said external device.

15. The method according to claim 14, wherein the control unit instructs the visibility by a visibility matrix which may be mapped to interest groups having assigned levels of rights or insight in view of privacy, security and personalisation.

16. The method according to claim 7, wherein said interface in connection with said control unit and/or said secure element may permanently keep track of last accessed application identifiers and may pass or concurrently maintain a data structure or set of selected parameters.

17. The method according to claim 7, wherein said interface may be updated in cyclic manner and/or, scanned or activated using a timing which may be independent, incremental, selective, rhythmic, cyclic, planned or statistical.

18. A device, comprising:
a smartcard module;
a near field communication module;
a memory module including computer program code;
a processor configured to interconnect said smartcard module, said near field communication module and said memory module, wherein the memory and the computer program code are configured to, with the processor, cause the device at least to;
determine that an external radio frequency field from an external device has been detected by the near field communication module;
switch connection of the smartcard module from an internal communication connection with the processor to an external communication connection with the near field communication module, to pass radio frequency communication from the external device to the smartcard module in response to detecting that an interaction with one or more secure applications residing at the smartcard module is requested;
determine that the radio frequency communication between the smartcard module and the external device has ceased;
switch the connection of the smartcard module from the external communication connection with the near field communication module to the internal communication connection with the processor in response to the determination that the radio frequency communication between the smartcard module and the external device has ceased, for accessing information regarding applications involved in said radio frequency communication; and
process information of applications involved in said radio frequency communication.

19. The device according to claim 18, further comprising a secure element.

20. The device according to claim 19, wherein said secure element is an integrated, a detachable or an accessory part of said device, said smartcard module, said near field communication module, and/or said memory module.

21. The device according to claim 18, further comprising:
the memory and the computer program code are configured to, with the processor, cause the device at least to:
detect an external radio frequency field by a front-end suitable for radio frequency identification and near-field communication;
pass received information by the front-end to the processor which cuts off link to a secure element;
notify said processor that an external device tries to discover a smartcard application and switches a connection to said secure element and switch said connection to said processor off;
respond by said secure element to said smartcard application and conduct a communication to said external device and store information regarding accessed applications using information of a registry;
close said communication by said secure element and/or said external element;
detect that said communication between said secure element and said external device has ceased by said processor;
switch the internal communication connection by said processor; and
contact a dedicated application program interface of said secure element and read information out of said registry.

22. The device according to claim 20, further comprising:
the memory and the computer program code are configured to, with the processor, cause the device at least to:
pass radio frequency communication from an external device to a secure element in response of detecting that interaction with one or more secure applications residing at the secure element is requested;
switch to the internal communication connection for accessing information regarding applications involved in said radio frequency communication upon substantially immediately detecting that the radio frequency communication between the secure element and the external device has terminated; and
perform one or more predefined functions based on the accessed information.

23. The device according to claim 18, further comprising a clock module for controlling time oriented events within said device.

24. The device according to claim 18, further comprising a telecommunications module for connecting to a cellular adio network for receiving the overall digital receipt from a service provider.

25. The device according to claim 18, further comprising a receipt storage embedded within said smartcard module for storing transaction related data.

26. The device according to claim 18, wherein said secure element and/or an application store/s details regarding a transaction which may be accessed by the processor, wherein said details may comprise an indication of the status of a transaction.

27. A computer program product containing program code, in the form of a machine-readable medium with a program code stored on it, wherein said program code is arranged to carry out a method according to any one of claims 1-17, when executed on at least one of a computer, a processor, a micro or embedded controller, a computer system, a notebook, a personal data assistant and a smart phone.

28. A computer program product according to claim 27, wherein said program code is arranged to carry out said method after a loading operation of a data structure in a working or main memory of a computer or a plurality of computers of a computer network or operating a client in a client-server network.

29. A computer readable medium on which a data structure is stored, said data structure executing said method according to claim 1 after a loading operation of said data structure in a main memory of a computer or a plurality of computers of a computer network.

* * * * *